United States Patent Office 3,719,149
Patented Mar. 6, 1973

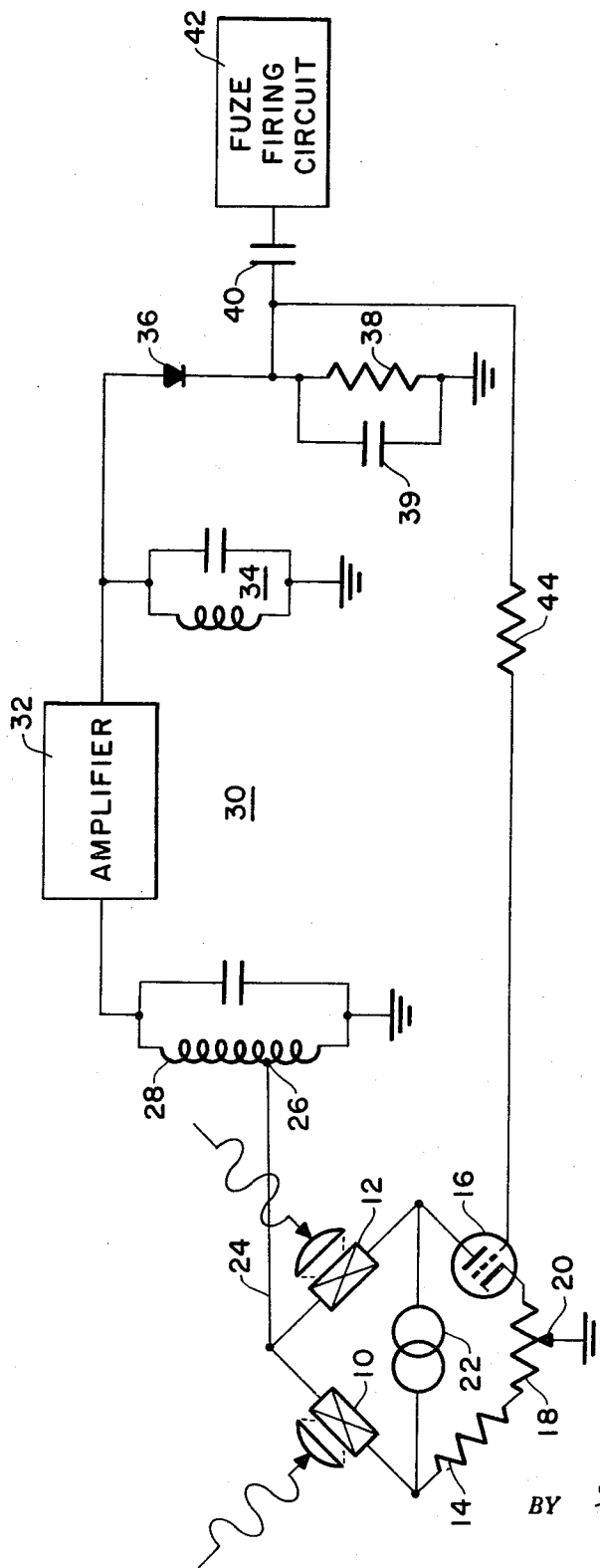

3,719,149
TWO CHANNEL OPTICAL FUZE WITH INFRARED SENSING BRIDGE
George F. Masin, Anaheim, Calif., assignor to the United States of America as represented by the Secretary of the Navy
Filed July 27, 1962, Ser. No. 214,171
Int. Cl. F42b 5/08
U.S. Cl. 102—70.2 R   2 Claims

ABSTRACT OF THE DISCLOSURE

This invention entails a high frequency bias to an infrared sensing bridge arrangement. When energy impinges on either sensor, the bridge becomes unbalanced, and a signal is sent which activates a fuze firing circuit.

---

The invention herein described may be manufactured and used by or for the Government of the United States of America for governmental purposes without the payment of any royalties thereon or therefor.

The present invention relates to a two channel optical fuze and more particularly to a two channel optical fuze which uses high frequency biasing of the infrared sensing elements.

Prior systems of this type have invariably employed D.C. bias on the infrared sensing elements with the attendant problems of the high noise level in the D.C. bias supply, impedance matching of the infrared sensor, temperature compensation and dual channel amplifier requirements.

The present invention employs a high frequency (10 to 20 kc.) bias to an infrared sensing bridge arrangement, the output of which is coupled through a tuned amplifier and filter arrangement to produce a usable output signal. A feedback circuit is coupled from the output to an active control element in one leg of the bridge to correct for changes in ambient conditions.

An object of the present invention is to provide an optical fuze system wherein high frequency A-C bias of the infrared sensors is employed.

Another object is to provide an optical fuze system which includes a novel means for obtaining self compensation due to ambient temperature changes of the sensing elements.

A further object of the invention is to provide a simplified optical fuze detecting system which has greater reliability than known systems.

Still another object of the invention is to provide a simplified optical fuze detecting system which utilizes a single tuned amplifier to amplify dual infrared sensor channels.

Still a further object of the invention is to provide an optical fuze detecting system wherein an active element is used to maintain bridge null based upon static changes in sensor elements.

Other objects and many of the attendant advantages of this invention will become readily appreciated as the same becomes better understood by reference to the following detailed description when considered in connection with the accompanying drawings wherein there is shown in a single figure a preferred embodiment of the invention.

Referring now to the drawing there is shown an electrical bridge circuit comprising four legs connected to provide two parallel branches. One pair of the legs or one branch comprises infrared sensors indicated diagrammatically at 10 and 12, and the other pair of legs constitute the other branch, one leg including a resistor 14 and the other leg including an active control element 16. Sensor 10 is the sensor for channel one and sensor 12 is the sensor for channel two of the optical fuze. The legs including resistor 14 and active control element 16 are connected together through resistor 18 having a movable tap 20 connected to ground, as shown. A high frequency source, 22 is connected across the common junctions of the legs including sensor 10 and resistor 14, and the legs including sensor 12 and control element 16.

The output from the bridge circuit is connected by conductor 24 to input terminal 26 of autotransformer 28 which forms part of a tuned amplifier 30 which includes a narrow band amplifier stage 32 and filter network 34. The output from amplifier 30 is detected by diode 36 and the detected output signal appearing across load resistor 38 is coupled through coupling capacitor 40 to a fuze firing circuit 42. The time constant of the load resistor 38 and capacitor 39 is greater than the period of high frequency bias source 22. The D.C. portion of the output signal is coupled through limiting resistor 44 to the control grid of triode 16.

The infrared sensors 10 and 12 which may be of any of the photo cells presently on the market, as for example the lead sulfide cell, should be matched for sensitivity, internal resistance and capacitance. Active control element 16 is shown as a triode vacuum tube, but may be of any other type suitable for responding to any change in the output when the system is in a quiescent condition.

In operation, a high frequency source is applied as a bias across the bridge. In practice a voltage having an amplitude of about 10 volts and with a frequency from 10 to 20 thousand c.p.s. were found to be satisfactory. When energy from an infrared source impinges on either sensor 10 or 12 the bridge will become unbalanced due to the change of conduction of the cell on which the energy impinges. The output from the bridge is amplified by autotransformer 28 and further amplified in a narrow band amplifier 32 which may be of any type having a gain of 10 to 100 and a bandwidth of ±2 kc. centered around 20 kc. The carrier or bias signal is removed by the action of diode 36 and the time constant of resistor capacitor combination 38 and 39, leaving the intelligence generated by one or both of the sensors. This signal is fed into a fuze firing circuit which is actuated when the proper signal or signals is received. As is well known in optical fuzing, the target must be detected in a particular sequence by the detecting channels in order to activate the fuze firing circuit. The D.C. output across load 38 is also fed back to the grid of triode 16 with a polarity tending to drive the output of the bridge to zero. This D.C. voltage therefore will not affect the response of the photoconductors to infrared sources but will compensate for changes in ambient conditions. The initial balance of the bridge is made adjusting movable tap 20 on resistor 18.

Obviously many modifications and variations of the present invention are possible in the light of the above teachings. It is therefore to be understood that within the scope of the appended claims the invention may be practiced otherwise than as specifically described.

What is claimed is:
1. In an optical fuzing system the combination comprising:
   (a) a bridge circuit having a pair of parallel connected branches,
   (b) one of said branches comprising a vacuum tube triode and a resistor connected in series,
   (c) the other of said branches comprising a pair of infrared sensors connected in series,
   (d) a source of alternating current connected across said parallel branches,
   (e) an output terminal connected to the common connection between said infrared sensors, the opposite junction of said bridge being connected to a common terminal through a variable tapped resistor,

(f) said output terminal being connected to the input of a step-up autotransformer for amplifying the output signal from said bridge, (g) the output of said autotransformer being coupled to the input of a narrow band amplifier for amplifying a predetermined band of frequencies, (h) the output of said narrow band amplifier being coupled to a diode detecting circuit including a load resistor, (i) fuze firing circuit means coupled across said load resistor for firing a fuze in response to pulses produced by said infrared sensors, and (j) feedback circuit means including a current limiting resistor coupling the D.C. component of the signal appearing across said load resistor to the control grid of said vacuum tube.

2. In an optical fuzing system, an improvement in the detecting device comprising:

(a) a first circuit means for detecting the presence of infrared energy comprising a bridge circuit having a pair of parallel connected branches, (b) one of said branches comprising an infrared sensor and a vacuum tube triode connected in series, (c) the other of said branches comprising an infrared sensor and a resistor connected in series, (d) an alternating current source coupled across said bridge circuit at points intermediate the infrared sensor and resistor in one branch and intermediate the infrared sensor and vacuum triode tube in the other branch for providing a predetermined bias voltage, (e) amplifying and rectifying means coupled across said parallel branches for amplifying and detecting the output of said first circuit means, (f) feedback circuit means coupled from said rectifying means to said vacuum tube triode for compensating for any ambient changes in the output of said first circuit means.

References Cited

UNITED STATES PATENTS

| | | | |
|---|---|---|---|
| 2,932,743 | 4/1960 | Atwood | 250—83.3 |
| 2,896,089 | 7/1959 | Wesch | 250—215 |
| 2,497,129 | 2/1950 | Liston | 250—83.3 |
| 2,358,103 | 9/1944 | Ryder | 250—210 X |
| 3,879,401 | 3/1959 | Chicurel | 250—83.3 IR |
| 3,094,617 | 6/1963 | Humphries et al. | 250—83.3 IR |
| 3,096,650 | 7/1963 | Lowenstein | 250—83.3 IR |

FOREIGN PATENTS

| | | | |
|---|---|---|---|
| 718,580 | 3/1942 | German | 324—57.2 |

CARL D. QUARFORTH, Primary Examiner

P. A. NELSON, Assistant Examiner

U.S. Cl. X.R.

250—83.3 H, 210